(12) United States Patent
Abe et al.

(10) Patent No.: US 7,727,677 B2
(45) Date of Patent: Jun. 1, 2010

(54) NONAQUEOUS ELECTROLYTE SOLUTION AND LITHIUM SECONDARY BATTERY USING SAME

(75) Inventors: Koji Abe, Ube (JP); Takaaki Kuwata, Ube (JP); Hirofumi Takemoto, Ube (JP)

(73) Assignee: Ube Industries, Ltd., Ube-shi (JP)

( * ) Notice: Subject to any disclaimer, the term of this patent is extended or adjusted under 35 U.S.C. 154(b) by 641 days.

(21) Appl. No.: 11/596,862

(22) PCT Filed: May 18, 2005

(86) PCT No.: PCT/JP2005/009049

§ 371 (c)(1),
(2), (4) Date: Nov. 17, 2006

(87) PCT Pub. No.: WO2005/122318

PCT Pub. Date: Dec. 22, 2005

(65) Prior Publication Data

US 2008/0038644 A1      Feb. 14, 2008

(30) Foreign Application Priority Data

May 28, 2004 (JP) .............................. 2004-159285

(51) Int. Cl.
*H01M 6/16* (2006.01)
(52) U.S. Cl. ................ 429/330; 429/340; 429/332; 429/334; 429/342; 429/231.1; 429/331; 429/338; 429/188
(58) Field of Classification Search ................ 429/330, 429/340, 332, 334, 342, 231.1, 331, 338, 429/188
See application file for complete search history.

(56) References Cited

U.S. PATENT DOCUMENTS

| | | | |
|---|---|---|---|
| 6,479,191 B1 | 11/2002 | Hamamoto et al. | |
| 2002/0164531 A1 | 11/2002 | Sekino et al. | |

FOREIGN PATENT DOCUMENTS

| | | | |
|---|---|---|---|
| EP | 1 304 758 A1 | 4/2003 | |
| JP | 8 45545 | 2/1996 | |
| JP | 11-273724 | 10/1999 | |
| JP | 11-273725 | 10/1999 | |
| JP | 2000 003724 | 1/2000 | |
| JP | 2001 256995 | 9/2001 | |
| JP | 2002-367673 | * 12/2002 | |
| JP | 2003 59532 | 2/2003 | |
| JP | 2003 338277 | 11/2003 | |
| JP | 2004 31366 | 1/2004 | |
| JP | 2004 134261 | 4/2004 | |
| JP | 2004 319212 | 11/2004 | |
| WO | WO 00/31817 | 6/2000 | |

OTHER PUBLICATIONS

U.S. Appl. No. 10/592,702, filed Sep. 13, 2006, Abe et al.
U.S. Appl. No. 11/814,372, filed Jul. 20, 2007, Abe et al.
U.S. Appl. No. 11/722,883, filed Jun. 27, 2007, Abe et al.

* cited by examiner

*Primary Examiner*—Laura S Weiner
(74) *Attorney, Agent, or Firm*—Oblon, Spivak, McClelland, Maier & Neustadt, L.L.P.

(57) ABSTRACT

Disclosed is a lithium secondary battery which is excellent in battery characteristics such as long-term cycle characteristics, capacity and shelf life characteristics. Also disclosed is a nonaqueous electrolyte solution which can be used for such a lithium secondary battery. Specifically disclosed is a nonaqueous electrolyte solution for lithium secondary batteries obtained by dissolving an electrolyte salt in a nonaqueous solvent which is characterized by containing 0.01-10% by weight of a carboxylate compound represented by the general formula (I) below and 0.01-10% by weight or 0.01-10% by volume of a vinylene carbonate and/or 1,3-propane sultone. Also disclosed is a lithium secondary battery using such a nonaqueous electrolyte solution. (In the formula, $R^2$ represents a hydrogen atom or $COOR^3$ group, $R^1$ and $R^3$ respectively represent an alkyl group, a cycloalkyl group, an alkenyl group, an alkynyl group or a phenyl group, and X represents an alkynylene group or an alkenylene group.)

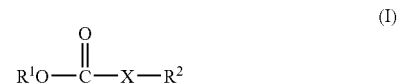

(I)

20 Claims, No Drawings

NONAQUEOUS ELECTROLYTE SOLUTION AND LITHIUM SECONDARY BATTERY USING SAME

TECHNICAL FIELD

The present invention relates to a lithium secondary battery having excellent battery characteristics such as long-term battery cycling property, electrical capacity and storage property, and to a nonaqueous electrolyte solution usable for such a lithium secondary battery.

BACKGROUND ART

In recent years, lithium secondary batteries have been widely used as driving power supplies for small electronic devices and the like. Such lithium secondary batteries are mainly constituted of a positive electrode, a nonaqueous electrolyte solution and a negative electrode. In particular, lithium secondary batteries constituted of a lithium compound oxide such as $LiCoO_2$ as the positive electrode and a carbon material or a lithium metal as the negative electrode are used. The nonaqueous electrolyte solution for use in such lithium secondary batteries includes a carbonate such as ethylene carbonate (EC) or propylene carbonate (PC).

There is, however, a need for secondary batteries having better characteristics such as battery cycling property and electrical capacity.

A lithium secondary battery using, for example, $LiCoO_2$, $LiMn_2O_4$ or $LiNiO_2$ as a positive electrode brings about a reduction of the battery performance, when a part of the solvent of the nonaqueous electrolyte solution locally undergoes an oxidative decomposition during the charging, because the decomposition products inhibit the desired electrochemical reaction of the battery. Such a reduction is considered to be attributed to an electrochemical oxidation of the solvent at the interface between the positive electrode material and the nonaqueous electrolyte solution.

Also, a lithium secondary battery using, for example, a highly crystallized carbon material, such as natural graphite or artificial graphite, as a negative electrode brings about a reduction of the battery performance, when the solvent of the nonaqueous electrolyte solution undergoes a reductive decomposition on the surface of the negative electrode during the charging. Even in the case of ethylene carbonate (EC) which is widely generally used as a solvent for the nonaqueous electrolyte solution, a part thereof undergoes a reductive decomposition during repeated charging and discharging. Propylene carbonate (PC) having a low melting point and a high dielectric constant is preferable for use as a nonaqueous solvent because of its high electric conductivity even at low temperatures. However, PC has not been used for lithium secondary batteries because the decomposition thereof is significant.

For the purpose of improving the battery characteristics of such lithium secondary batteries, a variety of proposals have been made.

For example, Patent document 1 discloses an electrolyte solution containing the first solvent such as propylene carbonate, the second solvent such as dimethyl carbonate or diethyl carbonate, and vinylene carbonate in an amount of 0.01 to 10% by weight based on the solvent mixture. Patent document 2 discloses an electrolyte solution containing 0.1 to 5% by weight of vinylene carbonate and an asymmetrical linear carbonate.

Patent document 3 discloses a nonaqueous electrolyte solution containing a mixed solvent of ethylene carbonate and dimethyl carbonate to which a diester of a dicarboxylic acid having an unsaturated group, such as diethyl acetylenedicarboxylate, is added.

Patent document 4 discloses a nonaqueous electrolyte solution containing a diester of acetylenedicarboxylic acid having a specific structure. This compound differs from a carboxylate compound used in the present invention. Further, no consideration is made on combination with a nonaqueous solvent.

Patent document 5 discloses an electrolyte solution containing a cyclic carbonate and a linear carbonate, as main ingredients, and 0.1 to 4% by weight of 1,3-propane sultone.

The techniques disclosed in Patent documents 1 to 5, however, cannot satisfy the battery characteristics required in recent years. There is a demand for an electrolyte solution having more excellent cycling characteristics for providing lithium secondary batteries with high capacity.

Patent document 1: Japanese Unexamined Patent Publication H08-45545

Patent document 2: Japanese Unexamined Patent Publication H11-185806

Patent document 3: Japanese Unexamined Patent Publication 2001-256995

Patent document 4: Japanese Unexamined Patent Publication 2003-59532

Patent document 5: Japanese Unexamined Patent Publication 2000-3724

DISCLOSURE OF THE INVENTION

It is the object of the present invention to provide a lithium secondary battery which is excellent in long-term cycling characteristics and in battery characteristics, such as electrical capacity and charged-state storage property, and to provide a nonaqueous electrolyte solution usable for such a lithium secondary battery.

The present inventors have made a study with a view toward solving the above problems. As a result, it has been found that the above problems can be solved by incorporating, as additives, a specific carboxylate compound together with vinylene carbonate and/or 1,3-propane sultone into a nonaqueous electrolyte solution in specific amounts.

Thus, the present invention provides a nonaqueous electrolyte solution for lithium secondary batteries, in which an electrolyte salt is dissolved in a nonaqueous solvent, the nonaqueous electrolyte solution comprising 0.01 to 10% by weight of a carboxylate compound represented by the general formula (I) shown below, and 0.01 to 10% by weight or 0.01 to 10% by volume of a vinylene carbonate and/or 1,3-propane sultone:

[Chemical formula 1]

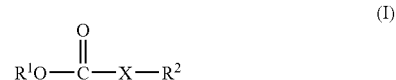

(I)

wherein $R^1$ represents a $C_1$ to $C_{12}$ alkyl group which may be branched, a $C_3$ to $C_8$ cycloalkyl group, a $C_2$ to $C_{12}$ alkenyl group which may be branched, a $C_2$ to $C_{12}$ alkynyl group which may be branched, or an unsubstituted or substituted phenyl group, $R^2$ represents a hydrogen atom or a $COOR^3$ group where $R^3$ represents a $C_1$ to $C_{12}$ alkyl group which may be branched, a $C_3$ to $C_8$ cycloalkyl group, a $C_2$ to $C_{12}$ alkenyl group which may be branched, a $C_2$ to $C_{12}$ alkynyl group which may be branched, or an unsubstituted or substituted phenyl group, and X represents a $C_2$ to $C_4$ alkynylene group or a $C_2$ to $C_4$ alkenylene group containing at least one unsaturated bond.

The present invention also provides a lithium secondary battery comprising a positive electrode, a negative electrode, and a nonaqueous electrolyte solution which includes an electrolyte salt dissolved in a nonaqueous solvent, the positive electrode including a lithium compound oxide-containing material, the negative electrode including a material which can occlude and release lithium, and the nonaqueous electrolyte solution comprising 0.01 to 10% by weight of a carboxylate compound represented by the general formula (I) shown above, and 0.01 to 10% by weight or 0.01 to 10% by volume of a vinylene carbonate and/or 1,3-propane sultone.

According to the present invention, a lithium secondary battery having excellent battery characteristics such as battery cycling characteristics, electrical capacity and storage property can be provided.

In particular, by incorporating, as additives, a carboxylate compound together with vinylene carbonate (VC) and/or 1,3-propane sultone (PS) into a nonaqueous electrolyte solution in specific amounts, cycling characteristics of the lithium secondary battery can be improved particularly for a long period of time.

BEST MODE FOR CARRYING OUT THE INVENTION

It has been found that, when a nonaqueous electrolyte solution, obtained by incorporating, as additives, a specific carboxylate compound together with vinylene carbonate and/or 1,3-propane sultone in specific amounts thereinto, is used for a lithium secondary battery designed to have a high capacity, an improvement of cycling characteristics, which has been a problem to be solved, may be attained. Although its working effect is unknown, it is inferred that a strong coating film is formed on the negative electrode of the lithium secondary battery by using the above-mentioned specific additives in specific amounts.

Specific embodiments of the present invention will be described below.

The carboxylate compound used in the present invention is represented by the general formula (I) shown below:

[Chemical Formula 2]

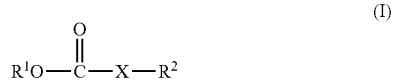

(I)

In the general formula (I), $R^1$ represents a $C_1$ to $C_{12}$, preferably $C_1$ to $C_8$, more preferably $C_1$ to $C_3$ alkyl group which may be branched, a $C_3$ to $C_8$ cycloalkyl group, a $C_2$ to $C_{12}$, preferably $C_2$ to $C_8$, more preferably $C_2$ to $C_4$ alkenyl group which may be branched, a $C_2$ to $C_{12}$, preferably $C_2$ to $C_8$, more preferably $C_2$ to $C_4$ alkynyl group which may be branched, or an unsubstituted or substituted phenyl group.

$R^2$ represents a hydrogen atom or a $COOR^3$ group where $R^3$ represents a $C_1$ to $C_{12}$, preferably $C_1$ to $C_8$, more preferably $C_1$ to $C_3$ alkyl group which may be branched, a $C_3$ to $C_8$ cycloalkyl group, a $C_2$ to $C_{12}$, preferably $C_2$ to $C_8$, more preferably $C_2$ to $C_4$ alkenyl group which may be branched, a $C_2$ to $C_{12}$, preferably $C_2$ to $C_8$, more preferably $C_2$ to $C_4$ alkynyl group which may be branched, or an unsubstituted or substituted phenyl group.

X represents a $C_2$ to $C_4$ alkynylene or a $C_2$ to $C_4$ alkenylene containing at least one unsaturated bond. As the alkynylene group, there may be mentioned an ethynylene group, a 2-butynylene group and a butadiynylene group. As the alkenylene group, there may be mentioned a butadienylene group. Above all, an alkynylene group is particularly preferable.

Specific examples of the compound of the general formula (I) in which X is an ethynylene group include methyl propiolate, ethyl propiolate, n-propyl propiolate, isopropyl propiolate, n-butyl propiolate, isobutyl propiolate, t-butyl propiolate, n-pentyl propiolate, n-hexyl propiolate, heptyl propiolate, octyl propiolate, methyl 2,4-pentadiynoate, ethyl 2,4-pentadiynoate, propyl 2,4-pentadiynoate, butyl 2,4-pentadiynoate, pentyl 2,4-pentadiynoate, hexyl 2,4-pentadiynoate, dimethyl acetylenedicarboxylate, diethyl acetylenedicarboxylate, dipropyl acetylenedicarboxylate, dibutyl acetylenedicarboxylate, dipentyl acetylenedicarboxylate, dihexyl acetylenedicarboxylate, diheptyl acetylenedicarboxylate, dioctyl acetylenedicarboxylate, dinonyl acetylenedicarboxylate, didecyl acetylenedicarboxylate, diundecyl acetylenedicarboxylate and didodecyl acetylenedicarboxylate.

Above all, alkyl propiolates having a $C_1$ to $C_4$ alkyl group such as methyl propiolate, ethyl propiolate and t-butyl propiolate and dialkyl acetylenedicarboxylates having $C_1$ to $C_3$ alkyl groups such as dimethyl acetylenedicarboxylate and diethyl acetylenedicarboxylate are particularly preferable.

Specific examples of the compound of the general formula (I) in which X is a 2-butynylene group include dimethyl 3-hexynedioate, diethyl 3-hexynedioate, dipropyl 3-hexynedioate, dibutyl 3-hexynedioate, dipentyl 3-hexynedioate, dihexyl 3-hexynedioate, diheptyl 3-hexynedioate and dioctyl 3-hexynedioate.

Above all, dialkyl 3-hexynedioates having $C_1$ to $C_3$ alkyl groups such as dimethyl 3-hexynedioate and diethyl 3-hexynedioate are particularly preferable.

Specific examples of the compound of the general formula (I) in which X is a butadiynylene group include dimethyl 2,4-hexadiynedioate, diethyl 2,4-hexadiynedioate, dipropyl 2,4-hexadiynedioate, dibutyl 2,4-hexadiynedioate, dipentyl 2,4-hexadiynedioate, dihexyl 2,4-hexadiynedioate, diheptyl 2,4-hexadiynedioate, dioctyl 2,4-hexadiynedioate, dinonyl 2,4-hexadiynedioate, didecyl 2,4-hexadiynedioate, diundecyl 2,4-hexadiynedioate and didodecyl 2,4-hexadiynedioate.

Above all, dialkyl 2,4-hexadiynedioates having $C_1$ to $C_3$ alkyl groups such as dimethyl 2,4-hexadiynedioate are preferable.

Specific examples of the compound of the general formula (I) in which X is a butadienylene group include dimethyl 2,4-hexadienedioate, diethyl 2,4-hexadienedioate, di(n-propyl) 2,4-hexadienedioate, diisopropyl 2,4-hexadienedioate, diallyl 2,4-hexadienedioate, dibutyl 2,4-hexadienedioate, dipentyl 2,4-hexadienedioate, dihexyl 2,4-hexadienedioate, diheptyl 2,4-hexadienedioate, dioctyl 2,4-hexadienedioate, dinonyl 2,4-hexadienedioate, didecyl 2,4-hexadienedioate, diundecyl 2,4-hexadienedioate and didodecyl 2,4-hexadienedioate.

Above all, dialkyl 2,4-hexadienedioates having $C_1$ to $C_3$ alkyl groups such as dimethyl 2,4-hexadienedioate are preferable.

The carboxylate compound represented by the general formula (I) may be an asymmetrical compound.

As concrete examples of the asymmetrical carboxylate, there may be mentioned methyl ethyl acetylenedicarboxylate, methyl propyl acetylenedicarboxylate, methyl isopropyl acetylenedicarboxylate, methyl butyl acetylenedicarboxylate, methyl isobutyl acetylenedicarboxylate, methyl t-butyl acetylenedicarboxylate, methyl pentyl acetylenedicarboxylate, methyl hexyl acetylenedicarboxylate, methyl heptyl acetylenedicarboxylate, methyl octyl acetylenedicarboxylate, methyl nonyl acetylenedicarboxylate, methyl decyl acetylenedicarboxylate, methyl undecyl acetylenedicarboxylate, methyl dodecyl acetylenedicarboxylate, ethyl propyl acetylenedicarboxylate, ethyl butyl acetylenedicarboxylate, ethyl pentyl acetylenedicarboxylate, ethyl hexyl acetylenedicarboxylate, ethyl heptyl acetylenedicarboxylate, ethyl octyl acetylenedicarboxylate, ethyl nonyl acetylenedicarboxylate, ethyl decyl acetylenedicarboxylate, ethyl undecyl acetylenedicarboxylate, ethyl dodecyl acetylenedicarboxylate, propyl butyl acetylenedicarboxylate, propyl pentyl acetylenedicarboxylate, propyl hexyl acetylenedicarboxylate, propyl octyl acetylenedicarboxylate, butyl pentyl acetylenedicarboxylate, butyl hexyl acetylenedicarboxylate, pentyl hexyl acetylenedicarboxylate, methyl ethyl 3-hexynedioate, methyl propyl 3-hexynedioate, methyl butyl 3-hexynedioate, ethyl propyl 3-hexynedioate, methyl ethyl 2,4-hexadiynedioate, methyl propyl 2,4-hexadiynedioate, methyl butyl 2,4-hexadiynedioate, ethyl propyl 2,4-hexadiynedioate, methyl ethyl 2,4-hexadienedioate, methyl propyl 2,4-hexadienedioate, methyl butyl 2,4-hexadienedioate and ethyl propyl 2,4-hexadiynedioate.

Above all, dialkyl acetylenedicarboxylates having $C_1$ to $C_3$ alkyl groups such as methyl ethyl acetylenedicarboxylate are particularly preferable.

When the content of the carboxylate compound represented by the above general formula (I) is excessively high, the conductivity of the electrolyte solution may change to occasionally cause a reduction of the battery characteristics. Therefore, the content is not more than 10% by weight, particularly preferably not more than 5% by weight, most preferably not more than 3% by weight, based on the weight of the nonaqueous electrolyte solution. When the content is excessively low, on the other hand, a coating film may not be sufficiently formed and expected battery characteristics may not be obtained. Accordingly, the content is not less than 0.01% by weight, particularly preferably not less than 0.05% by weight, most preferably not less than 0.1% by weight, based on the weight of the nonaqueous electrolyte solution.

The nonaqueous electrolyte solution of the present invention contains 0.01 to 10% by weight of the above carboxylate compound and additionally contains 0.01 to 10% by weight, preferably 0.02 to 9% by weight, or 0.01 to 10% by volume, preferably 0.02 to 9% by volume, of a vinylene carbonate and/or 1,3-propane sultone.

When the content of vinylene carbonate in the nonaqueous electrolyte solution of the present invention is excessively high, the conductivity of the electrolyte may change and the battery characteristics are occasionally reduced. Therefore, the content is preferably not more than 10% by weight, more preferably not more than 5% by weight, based on the weight of the nonaqueous electrolyte solution. When the content is excessively low, on the other hand, a coating film may not be sufficiently formed and expected cell characteristics may not be obtained. Accordingly, the content is preferably not less than 0.01% by weight, particularly preferably not less than 0.05% by weight, most preferably not less than 0.1% by weight, based on the weight of the nonaqueous electrolyte solution. The content of the vinylene carbonate is preferably 0.01 to 10% by volume, more preferably 0.02 to 9% by volume, still more preferably 0.02 to 8% by volume and particularly preferably 0.05 to 6% by volume, of the nonaqueous solvent.

When the content of 1,3-propane sultone is excessively high, the conductivity of the electrolyte may change and the battery characteristics are occasionally reduced. Therefore, the content is preferably not more than 10% by weight, more preferably not more than 5% by weight, based on the weight of the nonaqueous electrolyte solution. When the content is excessively low, on the other hand, a coating film may not be sufficiently formed and desired cell characteristics may not be obtained. Accordingly, the content is preferably not less than 0.01% by weight, particularly preferably not less than 0.05% by weight, most preferably not less than 0.1% by weight, based on the weight of the nonaqueous electrolyte solution. The content of the 1,3-propane sultone is preferably 0.01 to 10% by volume, more preferably 0.02 to 9% by volume, still more preferably 0.02 to 6% by volume and particularly preferably 0.05 to 4% by volume, of the nonaqueous solvent.

1,3-propane sultone may be used together with vinylene carbonate. In such a case, a total amount of 1,3-propane sultone and vinylene carbonate is preferably 0.01 to 10% by volume, more preferably 0.02 to 9% by volume, still more preferably 0.05 to 8% by volume and particularly preferably 0.1 to 7% by volume, of the nonaqueous solvent.

As the nonaqueous solvent used in the present invention, there may be mentioned, for example, cyclic carbonates such as ethylene carbonate (EC), propylene carbonate (PC), butylene carbonate, fluoroethylene carbonate, dimethylvinylene carbonate and vinyl ethylene carbonate; lactones such as γ-butyrolactone, γ-valerolactone and α-angelicalactone; linear carbonates such as dimethyl carbonate (DMC), methyl ethyl carbonate (MEC), diethyl carbonate (DEC), methyl propyl carbonate, dipropyl carbonate, methyl butyl carbonate and dibutyl carbonate; ethers such as tetrahydrofuran, 2-methyltetrahydrofuran, 1,4-dioxane, 1,2-dimethoxyethane, 1,2-diethoxyethane and 1,2-dibutoxyethane; nitriles such as acetonitrile and adiponitrile; phosphoric esters such as trimethyl phosphate and trioctyl phosphate; linear esters such as methyl propionate, methyl pivalate, butyl pivalate, hexyl pivalate, octyl pivalate, dimethyl oxalate, ethyl methyl oxalate and diethyl oxalate; amides such as dimethylformamide; sulfate compounds such as 1,4-propane sultone, divinyl sulfone, 1,4-butanediol dimethanesulfonate, glycol sulfite, propylene sulfite, glycol sulfate and propylene sulfate; and aromatic compounds such as biphenyl, alkylbiphenyl, terphenyl, partially hydrogenated terphenyl, cyclohexylbenzene, t-butylbenzene, t-amylbenzene (TAB), diphenyl ether and dibenzofuran.

These nonaqueous solvents are generally used in combination to achieve appropriate properties. As examples of the combination, there may be mentioned various combinations such as a combination of a cyclic carbonate and a linear carbonate, a combination of a cyclic carbonate and a lactone, a combination of a lactone and a linear ester, a combination of a cyclic carbonate, a lactone and a linear ester, a combination of a cyclic carbonate, a linear carbonate and a lactone, a combination of cyclic carbonate and an ether, a combination of a cyclic carbonate, a linear carbonate and an ether, and a combination of a cyclic carbonate, a linear carbonate and a linear ester. The mixing ratio is not specifically limited.

Above all, a combination of cyclic carbonate and a linear carbonate is preferable. The proportion of the cyclic carbonate and the linear carbonate is preferably such that the volume ratio of the cyclic carbonate to the linear carbonate is 20:80 to 40:60, particularly preferably 25:75 to 35:65.

Of the cyclic carbonates mentioned above, it is particularly preferable to use ethylene carbonate (EC), propylene carbonate (PC), butylenes carbonate, fluoroethylene carbonate and vinylethylene carbonate.

Of the above-mentioned linear carbonates, it is preferable to use asymmetrical carbonates such as methyl ethyl carbonate (MEC), methyl propyl carbonate and methyl butyl carbonate, and symmetrical carbonates such as dimethyl carbonate (DMC) and diethyl carbonate (DEC). In particular, it is preferable to use methyl ethyl carbonate (MEC) which is liquid at low temperatures and has low evaporation due to its relatively high boiling point. Further, of the linear carbonates, the volume ratio of methyl ethyl carbonate (MEC) which is an asymmetrical linear carbonate to dimethyl carbonate (DMC) and/or diethyl carbonate (DEC) which is/are a symmetrical linear carbonate is preferably 100:0 to 51:49, more preferably 100:0 to 70:30.

It is also possible to use dimethyl carbonate (DMC) and diethyl carbonate (DEC) in a DMC/DEC volume ratio of 90:10 to 10:90.

Of the above combinations, it is preferred that the combination in which a lactone is used has such a proportion that the volume ratio of the lactone is the highest.

For example, the volume ratio of a carbonate to a lactone is preferably 10:90 to 40:60, particularly preferably 20:80 to 35:65.

Incidentally, it is preferred that the nonaqueous solvents mentioned above are previously refined to have a high purity.

As the electrolyte salt used in the present invention, there may be mentioned, for example, lithium salts having a linear alkyl group or groups such as $LiPF_6$, $LiBF_4$, $LiClO_4$, $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$ and $LiPF_5(iso-C_3F_7)$ and lithium salts having a cyclic alkylene group or groups such as $(CF_2)_2(SO_2)_2NLi$ and $(CF_2)_3(SO_2)_2NLi$.

Above all, particularly preferable electrolyte salts are $LiPF_6$ and $LiBF_4$, $LiN(SO_2CF_3)_2$ and the most preferable electrolyte salt is $LiPF_6$. These electrolyte salts may be employed singly or in combination of two or more thereof.

As the preferable combination of these electrolyte salts, there may be mentioned a combination of $LiPF_6$ and $LiBF_4$, a combination of $LiPF_6$ and $LiN(SO_2CF_3)_2$ and a combination of $LiBF_4$ and $LiN(SO_2CF_3)_2$. Particularly preferable is a combination of $LiPF_6$ and $LiBF_4$. The volume ratio of $LiPF_6$ to $LiBF_4$ is preferably 80:20 to 99:1, particularly preferably 90:10 to 98:2.

The electrolyte salts may be mixed at any arbitrary ratio. When $LiPF_6$ is used in combination with other electrolyte salts, the proportion (molar ratio) of the other electrolyte salts relative to all the electrolyte salts is preferably 0.01 to 45%, more preferably 0.03 to 20%, still more preferably 0.05 to 10%. most preferably 0.05 to 5%.

The concentration of all of the electrolyte salts in which they are dissolved and used is generally preferably at least 0.3 M, more preferably at least 0.5 M, most preferably at least 0.7 M. The concentration of these electrolyte salts is preferably not greater than 3 M, more preferably not greater than 2.5 M, most preferably not greater than 2 M.

The electrolyte solution of the present invention may be obtained, for example, by mixing the above-described nonaqueous solvents, such as ethylene carbonate, propylene carbonate and methyl ethyl carbonate, dissolving the above-described electrolyte salts in the mixture, and further dissolving a carboxylate compound represented by the above general formula (I) therein. The electrolyte solution may also be obtained by first mixing a carboxylate compound represented by the above general formula (I) with nonaqueous solvents, such as ethylene carbonate, propylene carbonate and methyl ethyl carbonate, and then dissolving the above-described electrolyte salts in the mixture.

By incorporating, for example, air or carbon dioxide in the nonaqueous electrolyte solution of the present invention, the generation of gases by decomposition of the electrolyte solution may be prevented and the battery characteristics and battery properties such as cycling characteristics and storage property may be improved.

As the method for incorporating (dissolving) carbon dioxide or air in the nonaqueous electrolyte solution, there may be used (1) a method in which the nonaqueous electrolyte solution is previously contacted with air or a carbon dioxide-containing gas before the solution is poured in the battery; or (2) a method in which after the solution has been poured in the battery, air or a carbon dioxide-containing gas is charged in the battery before or after sealing the battery. These methods may be used in combination. It is preferred that the moisture content of the air or carbon dioxide-containing gas is as low as possible and that the air or carbon dioxide-containing gas have a dew point of $-40°$ C. or below, particularly preferably $-50°$ C. or below.

The electrolyte solution of the present invention is employed as a component of a secondary battery, particularly a lithium secondary battery. There are no limitations with respect to components constituting the secondary battery other than the electrolytic solution, and various conventionally used components can be employed.

Thus, for example, as a positive electrode active material, a lithium compound oxide containing cobalt, manganese or nickel may be used. Only one of such positive electrode active materials may be selectively used, or they may be used in combination of two or more thereof. As the lithium compound oxide, there may be mentioned, for example, $LiCoO_2$, $LiMn_2O_4$, $LiNiO_2$, $LiCo_{1-x}Ni_xO_2$ ($0.01<x<1$), $LiCo_{1/3}Ni_{1/3}Mn_{1/3}O_2$ and $LiNi_{1/2}Mn_{3/2}O_4$. Further, an appropriate mixture, such as a mixture of $LiCoO_2$ with $LiMn_2O_4$, a mixture of $LiCoO_2$ and $LiNiO_2$ or a mixture of $LiMn_2O_4$ and $LiNiO_2$, may be employed.

Of the above positive electrode active materials, preferably used is a lithium compound oxide, such as $LiCoO_2$, $LiMn_2O_4$ or $LiNiO_2$, which can be used with a charge potential of the positive electrode in a fully charged state of at least 4.3 V on Li basis. Lithium compound oxides such as $LiCo_{1/3}Ni_{1/3}Mn_{1/3}O_2$ and $LiNi_{1/2}Mn_{3/2}O_4$, which are usable at 4.4 V or higher are more preferred. The lithium compound oxides may be partly substituted with another element. For example, a part of Co of $LiCoO_2$ may be substituted by Sn, Mg, Fe, Ti, Al, Zr, Cr, V, Ga, Zn, Cu or the like element.

The conductive material for the positive electrode is not specifically limited as long as it is an electron conductive material which does not undergo a chemical change. Examples of the conductive agent include graphites, such as natural graphite (scaly graphite, etc.) and artificial graphite, and carbon blacks, such as acetylene black, Ketjen black, channel black, furnace black, lamp black and thermal black. The graphites and carbon blacks may be used as an appropriate mixture. The amount of the conductive material added to the positive electrode mixture is preferably 1 to 10% by weight, particularly preferably 2 to 5% by weight.

The positive electrode may be manufactured by kneading the above-mentioned positive electrode active material, conductive material such as acetylene black or carbon black, and a binder such as polytetrafluoroethylene (PTFE), polyvinylidene fluoride (PVDF), styrene-butadiene copolymer (SBR), acrylonitrile-butadiene copolymer (NBR) or carboxymethyl cellulose (CMC) to obtain a positive electrode mixture, rolling the positive electrode material on a collector such as an aluminum foil or a lath board made of a stainless steel, and then subjected the resulting assembly to a heat treatment at a temperature of about 50 to 250° C. for about 2 hours under vacuum.

As the negative electrode (negative electrode active material), a material capable of occluding and releasing lithium is used. For example, lithium metal, a lithium alloy, a carbon material (for example, thermally decomposed carbon materials, cokes, graphites (such as artificial graphite and natural graphite), fired organic polymer bodies, and carbon fibers), tin or tin compounds and silicon or silicon compounds. Part or all of carbon materials may be substituted by tin, a tin compound, silicon or a silicon compound so as to increase the battery capacity.

Above all, carbon materials are preferable. It is further preferable to use a graphite having a graphite crystal structure in which the (002)-plane spacing ($d_{002}$) is 0.340 nm or less, in particular in the range of 0.335 to 0.340 nm. Only one of the negative electrode active materials may be selectively used or two or more thereof may be used in combination.

A powdery material such as a carbon material is used as a negative electrode material after being kneaded with a binder such as a terpolymer of ethylene, propylene and a diene (EPDM), polytetrafluoroethylene (PTFE), polyvinylidene fluoride (PVDF), a copolymer of styrene and butadiene (SBR), a copolymer of acrylonitrile and butadiene (NBR) or carboxymethyl cellulose (CMC). A method of preparing the negative electrode is not specifically limited. The negative electrode may be prepared by a method similar to that for the above-described the positive electrode.

There are no specific limitations with respect to the structure of the lithium secondary battery. For instance, the secondary battery may be a battery of coin type comprising a positive electrode, a negative electrode, and a separator of a single or plural layers, or a cylindrical or square-shaped battery comprising a positive electrode, a negative electrode, and a separator in the form of a roll. As the separator, there can be used a known microporous film, woven fabric or non-woven fabric of a polyolefin such as polypropylene or polyethylene. The separator for batteries may be constituted in the form of a single-layer porous film or a laminated porous film.

The separator for batteries used in the present invention preferably has an air permeability of 1000 seconds/100 cc or less, more preferably 800 seconds/100 cc or less, most preferably 500 seconds/100 cc or less, because too high an air permeability causes a reduction of lithium ion conductivity so that the function as the separator for batteries becomes insufficient, though the permeability may vary depending upon the method of fabrication thereof. The air permeability is preferably at least 50 seconds/100 cc, more preferably at least 100 seconds/100 cc, most preferably at least 300 seconds/100 cc, since an excessively low permeability causes a reduction the mechanical strength thereof. The porosity of the separator is preferably 30 to 60%, more preferably 35 to 55%, most preferably 40 to 50%. A porosity in the above range is particularly preferable for reasons of improved capacity characteristics of the battery. The thickness of the separator for batteries is preferably 50 µm or less, more preferably 40 µm or less, most preferably 25 µm or less, since a higher energy density is obtainable as the thickness is as thin as possible. From the standpoint of the mechanical strengths, the thickness is preferably at least 5 µm, more preferably at least 10 µm, most preferably at least 15 µm.

In the present invention, in order to obtain the effect of the addition of the additives of the present invention including carboxylate compound represented by the above general formula (I), vinylene carbonate and/or 1,3-propane sultone, the density of the electrode material layer is important. In particular, the density of a layer of the positive electrode material formed on an aluminum foil is preferably 3.2 to 4.0 g/cm$^3$, more preferably 3.3 to 3.9 g/cm$^3$, most preferably 3.4 to 3.8 g/cm$^3$. When the density of the positive electrode material exceeds 4.0 g/cm$^3$, it is practically difficult to prepare the electrode. The density of a layer of the negative electrode material formed on a copper foil is preferably 1.3 to 2.0 g/cm$^3$, more preferably 1.4 to 1.9 g/cm$^3$, most preferably 1.5 to 1.8 g/cm$^3$. When the density of the negative electrode material layer exceeds 2.0 g/cm$^3$, it is practically difficult to prepare the electrode.

The suitable thickness of the electrode layer of the positive electrode (per one side of the collector) is 30 to 120 µm, preferably 50 to 100 µm, while the thickness of the electrode layer of the negative electrode (per one side of the collector) is 1 to 100 µm, preferably 3 to 70 µm. When the thickness of the electrode material layer is less than the above suitable range, the battery capacity is small due to a reduction of the amount of the active material in the electrode material layer. On the other hand, a thickness of the layer greater than the above range is not preferable because of a reduction of the cycling property and rate characteristics.

The lithium secondary battery of the present invention shows a good cycling property for a long period of time even when the end of charge voltage is 4.2 V or higher. In particular, the good cycle property can be maintained even when the end of charge voltage is 4.3 V or higher. The end of discharge voltage can be set to 2.5 V or higher, and further to 2.8 V or higher. There is no specific limitation with respect to a current value, but a constant current of 0.1 to 3 C is generally utilized. The lithium secondary battery of the present invention may be charged and discharged at −40° C. or higher, but the temperature is preferably 0° C. or higher. The battery may be charged and discharged at 100° C. or lower, but the temperature is preferably 80° C. or lower.

To cope with an increase of the internal pressure of the lithium secondary battery of the present invention, a relief valve may be provided on a sealing plate. Else, there may be adopted a method in which a cut is formed in a battery can, a gasket and other component parts. Further, it is preferred that the battery is provided with various customarily employed safety elements (at least one of a fuse, a bimetal and a PTC element as an overcurrent protection element).

If necessary, a plural number of the lithium secondary batteries of the present invention may be accommodated in a battery pack in series or in parallel. Such a battery pack may be provided with a safety element such as a PTC element, a temperature fuse, a fuse and/or a current breaking element, as well as a safety circuit (a circuit having a function of monitoring the voltage, temperature and current of each battery and/or whole packed batteries and shutting off the current).

EXAMPLES

The present invention will be more specifically described below with reference to Examples and Comparative Examples. It should be noted, however, that the present invention is not limited to these Examples in any way and that various combinations which could be easily thought of from the purport of the invention are possible. In particular, the combinations of solvents described in the Examples below are not restrictive.

Example 1

Preparation of Nonaqueous Electrolyte Solution

A nonaqueous solvent of ethylene carbonate (EC):vinylene carbonate (VC):methyl ethyl carbonate (MEC)=30:2:68 (volume ratio) was prepared. In this solvent LiPF$_6$ as an electrolyte salt was dissolved to a concentration of 1 M to obtain a nonaqueous electrolyte solution. To the nonaqueous electrolyte solution was further added methyl propiolate to a concentration of 1% by weight. The nonaqueous solvents and electrolyte salt used were previously refined to have increased purities.

Manufacture of Lithium Secondary Battery and Measurement of Battery Characteristics 94 percent by weight of $LiCoO_2$ (positive electrode active material), 3% by weight of acetylene black (conductive material) and 3% by weight of polyvinylidene fluoride (binder) were mixed, to which 1-methyl-2-pyrrolidone as a solvent was further added and mixed. The resulting mixture was applied onto an aluminum foil, dried, compression molded and heat treated to prepare a positive electrode. On the other hand, 95% by weight of artificial graphite (negative electrode active material) having a graphite type crystal structure with a (002)-plane spacing ($d_{002}$) of 0.335 nm were mixed with 5% by weight of polyvinylidene fluoride (binder), to which 1-methyl-2-pyrrolidone as a solvent was further mixed. The resulting mixture was applied onto a copper foil, dried, compression molded and heat treated to prepare a negative electrode. A cylindrical battery of an 18650 size (diameter: 18 mm, height: 65 mm) was then manufactured by using a microporous polypropylene film separator (thickness: 20 μm), pouring the above electrolyte solution and then trapping air having a dew point of −60° C. in the battery before sealing the battery. The battery was provided with a pressure release vent and an internal current breaking device (PTC element). At this time, the positive electrode had an electrode density of 3.5 g/cm$^3$, while the negative electrode had an electrode density of 1.6 g/cm$^3$. The electrode layer of the positive electrode had a thickness (per one side of the collector) of 65 μm, while the electrode layer of the negative electrode had a thickness (per one side of the collector) of 70 μm.

This 18650 battery was charged at a constant electric current of 2.2 A (1 C) at 25° C. to a voltage of 4.2 V The charging was thereafter continued for 3 hours in total under a constant voltage with a terminal voltage of 4.2 V. Next, the battery was discharged at a constant electric current of 2.2 A (1 C) to a terminal voltage of 3.0 V. The charge-discharge cycle was repeated. The initial discharge capacity (mAh) was almost the same (1.00) as that of a case in which 1M $LiPF_6$-EC/MEC (volume ratio: 30/70) was used as a nonaqueous electrolyte solution (Comparative Example 1) with no carboxylate compound being added thereto. The battery characteristics after 200 cycles were measured. The conditions for the preparation of the 18650 battery and the battery characteristics thereof are summarized in Table 1.

Example 2

A nonaqueous electrolyte solution was prepared, a cylindrical 18650 battery was manufactured and a charging-discharging cycle test was conducted in the same manner as that in Example 1 except that ethyl propiolate was used as an additive in an amount of 1% by weight based on the nonaqueous electrolyte solution. The results are shown in Table 1.

Example 3

A nonaqueous electrolyte solution was prepared, a cylindrical 18650 battery was manufactured and a charging-discharging cycle test was conducted in the same manner as that in Example 1 except that a nonaqueous solvent of ethylene carbonate (EC):1,3-propane sultone (PS):methyl ethyl carbonate (MEC)=30:2:68 (volume ratio) was prepared, that $LiPF_6$ as an electrolyte salt was dissolved in the nonaqueous solvent to a concentration of 1 M to obtain a nonaqueous electrolyte solution, and that t-butyl propiolate as an additive was used in an amount of 1% by weight based on the nonaqueous electrolyte solution. The results are shown in Table 1.

Example 4

A nonaqueous electrolyte solution was prepared, a cylindrical 18650 battery was manufactured and a charging-discharging cycle test was conducted in the same manner as that in Example 1 except that a nonaqueous solvent of EC:VC:MEC=30:5:65 (volume ratio) was prepared, that $LiPF_6$ as an electrolyte salt was dissolved in the nonaqueous solvent to a concentration of 1 M to obtain a nonaqueous electrolyte solution, and that dimethyl acetylenedicarboxylate as an additive was used in an amount of 0.1% by weight based on the nonaqueous electrolyte solution. The results are shown in Table 1.

Example 5

A nonaqueous electrolyte solution was prepared, a cylindrical 18650 battery was manufactured and a charging-discharging cycle test was conducted in the same manner as that in Example 1 except that a nonaqueous solvent of EC:VC:MEC=30:2:68 (volume ratio) was prepared, that $LiPF_6$ as an electrolyte salt was dissolved in the nonaqueous solvent to a concentration of 1 M to obtain a nonaqueous electrolyte solution, and that dimethyl acetylenedicarboxylate as an additive was used in an amount of 2% by weight based on the nonaqueous electrolyte solution. The results are shown in Table 1.

Example 6

A nonaqueous electrolyte solution was prepared, a cylindrical 18650 battery was manufactured and a charging-discharging cycle test was conducted in the same manner as that in Example 1 except that a nonaqueous solvent of EC:VC:MEC=30:0.1:69.9 (volume ratio) was prepared, that $LiPF_6$ as an electrolyte salt was dissolved in the nonaqueous solvent to a concentration of 1 M to obtain a nonaqueous electrolyte solution, and that dimethyl acetylenedicarboxylate as an additive was used in an amount of 5% by weight based on the nonaqueous electrolyte solution. The results are shown in Table 1.

Example 7

A nonaqueous electrolyte solution was prepared, a cylindrical 18650 battery was manufactured and a charging-discharging cycle test was conducted in the same manner as that in Example 1 except that a nonaqueous solvent of PC:VC:MEC=30:2:68 (volume ratio) was prepared, that $LiPF_6$ as an electrolyte salt was dissolved in the nonaqueous solvent to a concentration of 1 M to obtain a nonaqueous electrolyte solution, and that dimethyl acetylenedicarboxylate as an additive was used in an amount of 2% by weight based on the nonaqueous electrolyte solution. The results are shown in Table 1.

Example 8

A nonaqueous electrolyte solution was prepared, a cylindrical 18650 battery was manufactured and a charging-discharging cycle test was conducted in the same manner as that in Example 1 except that diethyl acetylenedicarboxylate as an additive was used in an amount of 1% by weight based on the nonaqueous electrolyte solution. The results are shown in Table 1.

Example 9

A nonaqueous electrolyte solution was prepared, a cylindrical 18650 battery was manufactured and a charging-discharging cycle test was conducted in the same manner as that in Example 1 except that diethyl 3-hexynedioate as an additive was used in an amount of 1% by weight based on the nonaqueous electrolyte solution. The results are shown in Table 1.

Example 10

A nonaqueous electrolyte solution was prepared, a cylindrical 18650 battery was manufactured and a charging-discharging cycle test was conducted in the same manner as that in Example 1 except that a nonaqueous solvent of EC:VC:PS:MEC=30:1:1:68 (volume ratio) was prepared, that $LiPF_6$ as an electrolyte salt was dissolved in the nonaqueous solvent to a concentration of 1 M to obtain a nonaqueous electrolyte solution, and that dimethyl 2,4-hexadiynedioate as an additive was used in an amount of 1% by weight based on the nonaqueous electrolyte solution. The results are shown in Table 1.

Example 11

A nonaqueous electrolyte solution was prepared, a cylindrical 18650 battery was manufactured and a charging-discharging cycle test was conducted in the same manner as that in Example 1 except that dimethyl 2,4-hexadienedioate as an additive was used in an amount of 1% by weight based on the nonaqueous electrolyte solution. The results are shown in Table 1.

Example 12

A nonaqueous electrolyte solution was prepared, a cylindrical 18650 battery was manufactured and a charging-discharging cycle test was conducted in the same manner as that in Example 1 except that $LiMn_2O_4$ was used in place of $LiCoO_2$ as the positive electrode (positive electrode active material) and that dimethyl acetylenedicarboxylate as an additive was used in an amount of 1% by weight based on the nonaqueous electrolyte solution. The results are shown in Table 1.

Comparative Example 1

A nonaqueous electrolyte solution was prepared, a cylindrical 18650 battery was manufactured and a charging-discharging cycle test was conducted in the same manner as that in Example 1 except that a nonaqueous solvent of EC:MEC=30:70 (volume ratio) was prepared, that $LiPF_6$ as an electrolyte salt was dissolved in the nonaqueous solvent to a concentration of 1 M to obtain a nonaqueous electrolyte solution, and that no additives were used. The results are shown in Table 1.

Comparative Example 2

A nonaqueous electrolyte solution was prepared, a cylindrical 18650 battery was manufactured and a charging-discharging cycle test was conducted in the same manner as that in Comparative Example 1 except that dimethyl acetylenedicarboxylate was used in an amount of 1% by weight. The results are shown in Table 1.

Comparative Example 3

A nonaqueous electrolyte solution was prepared, a cylindrical 18650 battery was manufactured and a charging-discharging cycle test was conducted in the same manner as that in Comparative Example 1 except that a nonaqueous solvent of EC:PC:γ-butyrolactone (GBL)=40:20:40 (volume ratio) was prepared. The results are shown in Table 1.

Comparative Example 4

A nonaqueous electrolyte solution was prepared, a cylindrical 18650 battery was manufactured and a charging-discharging cycle test was conducted in the same manner as that in Example 1 except that a nonaqueous solvent of EC:VC:MEC=30:2:68 (volume ratio) was prepared, that $LiPF_6$ as an electrolyte salt was dissolved in the nonaqueous solvent to a concentration of 1 M to obtain a nonaqueous electrolyte solution, and that no additives were used. The results are shown in Table 1.

Comparative Example 5

A nonaqueous electrolyte solution was prepared, a cylindrical 18650 battery was manufactured and a charging-discharging cycle test was conducted in the same manner as that in Example 1 except that a nonaqueous solvent of EC:PS:MEC=30:2:68 (volume ratio) was prepared, that $LiPF_6$ as an electrolyte salt was dissolved in the nonaqueous solvent to a concentration of 1 M to obtain a nonaqueous electrolyte solution, and that no additives were used. The results are shown in Table 1.

Comparative Example 6

A nonaqueous electrolyte solution was prepared, a cylindrical 18650 battery was manufactured and a charging-discharging cycle test was conducted in the same manner as that in Example 1 except that a nonaqueous solvent of EC:VC:MEC=25:13:62 (volume ratio) was prepared, that $LiPF_6$ as an electrolyte salt was dissolved in the nonaqueous solvent to a concentration of 1 M to obtain a nonaqueous electrolyte solution, and that dimethyl acetylenedicarboxylate was used as an additive in an amount of 1% by weight. The results are shown in Table 1.

TABLE 1

| | | Positive Electrode | Compound | Amount added % by weight | Composition of electrolyte solution (volume ratio) | Initial discharge capacity (relative value) | Retention of discharge capacity after 200 cycles (%) |
|---|---|---|---|---|---|---|---|
| Example | 1 | $LiCoO_2$ | Methyl propiolate | 1 | 1M $LiPF_6$ EC/VC/MEC = 30/2/68 | 1.00 | 82.2 |
| | 2 | $LiCoO_2$ | Ethyl propiolate | 1 | 1M $LiPF_6$ EC/VC/MEC = 30/2/68 | 1.00 | 80.7 |
| | 3 | $LiCoO_2$ | t-Butyl propiolate | 1 | 1M $LiPF_6$ EC/PS/MEC = 30/2/68 | 1.00 | 81.9 |
| | 4 | $LiCoO_2$ | Dimethyl acetylene-dicarboxylate | 0.1 | 1M $LiPF_6$ EC/VC/MEC = 30/5/65 | 1.00 | 83.0 |
| | 5 | $LiCoO_2$ | Dimethyl acetylene-dicarboxylate | 2 | 1M $LiPF_6$ EC/VC/MEC = 30/2/68 | 1.00 | 84.1 |
| | 6 | $LiCoO_2$ | Dimethyl acetylene-dicarboxylate | 5 | 1M $LiPF_6$ EC/VC/MEC = 30/0.1/69.9 | 1.00 | 80.8 |
| | 7 | $LiCoO_2$ | Dimethyl acetylene-dicarboxylate | 2 | 1M $LiPF_6$ PC/VC/DMC = 30/2/68 | 1.00 | 82.9 |
| | 8 | $LiCoO_2$ | Diethyl acetylene-dicarboxylate | 1 | 1M $LiPF_6$ EC/VC/MEC = 30/2/68 | 1.00 | 84.3 |
| | 9 | $LiCoO_2$ | Diethyl 3-hexynedioate | 1 | 1M $LiPF_6$ EC/VC/MEC = 30/2/68 | 1.00 | 80.6 |
| | 10 | $LiCoO_2$ | Dimethyl 2,4-hexadiynedioate | 1 | 1M $LiPF_6$ EC/VC/PS/MEC = 30/1/1/68 | 1.00 | 81.6 |
| | 11 | $LiCoO_2$ | Dimethyl 2,4-hexadienedioate | 1 | 1M $LiPF_6$ EC/VC/MEC = 30/2/68 | 1.00 | 81.3 |
| | 12 | $LiMn_2O_4$ | Dimethyl acetylene-dicarboxylate | 1 | 1M $LiPF_6$ EC/VC/MEC = 30/2/68 | 0.87 | 80.1 |
| Comparative Example | 1 | $LiCoO_2$ | None | 0 | 1M $LiPF_6$ EC/MEC = 30/70 | 1 | 70.8 |
| | 2 | $LiCoO_2$ | Dimethyl acetylene-dicarboxylate | 1 | 1M $LiPF_6$ EC/MEC = 30/70 | 1.00 | 71.5 |
| | 3 | $LiCoO_2$ | Dimethyl acetylene-dicarboxylate | 1 | 1M $LiPF_6$ EC/PC/GBL = 40/20/40 | 0.92 | 20.4 |
| | 4 | $LiCoO_2$ | None | 0 | 1M $LiPF_6$ EC/VC/MEC = 30/2/68 | 1.00 | 73.7 |
| | 5 | $LiCoO_2$ | None | 0 | 1M $LiPF_6$ EC/PS/MEC = 30/2/68 | 1.00 | 73.3 |
| | 6 | $LiCoO_2$ | Dimethyl acetylene-dicarboxylate | 1 | 1M $LiPF_6$ EC/VC/MEC = 25/13/62 | 0.99 | 66.5 |

Examples 13 to 20

Nonaqueous electrolyte solutions having compositions shown in Table 2 were prepared, cylindrical 18650 batteries were manufactured and charging-discharging cycle tests were conducted in a manner similar to that in Example 1 except that $LiCo_{1/3}Ni_{1/3}Mn_{1/3}O_2$ was used in place of $LiCoO_2$ as the positive electrode (positive electrode active material) and that compounds shown in Table 2 were added thereto in given amounts. The results are also shown in Table 2.

TABLE 2

| | | Positive Electrode | Compound | Amount added % by weight | Composition of electrolyte solution (volume ratio) | Initial discharge capacity (relative value) | Retention of discharge capacity after 200 cycles (%) |
|---|---|---|---|---|---|---|---|
| Example | 13 | $LiCo_{1/3}Ni_{1/3}Mn_{1/3}O_2$ | Diethyl acetylene-dicarboxylate | 1 | 1M $LiPF_6$ EC/VC/MEC/TAB = 30/2/65/3 | 1.00 | 83.1 |
| | 14 | $LiCo_{1/3}Ni_{1/3}Mn_{1/3}O_2$ | Diethyl acetylene-dicarboxylate | 2 | 1M $LiPF_6$ PC/VC/MEC = 30/2/68 | 1.00 | 83.0 |
| | 15 | $LiCo_{1/3}Ni_{1/3}Mn_{1/3}O_2$ | Diethyl acetylene-dicarboxylate | 1 | 1M $LiPF_6$ EC/VC/DMC/DEC = 30/2/34/34 | 1.00 | 82.8 |
| | 16 | $LiCo_{1/3}Ni_{1/3}Mn_{1/3}O_2$ | Diethyl acetylene-dicarboxylate | 1 | 1M $LiPF_6$ EC/VC/MEC/DEC = 30/2/34/34 | 1.00 | 82.5 |
| | 17 | $LiCo_{1/3}Ni_{1/3}Mn_{1/3}O_2$ | Diethyl acetylene-dicarboxylate | 1 | 1M $LiPF_6$ EC/PS/MEC = 30/2/68 | 1.00 | 82.7 |

TABLE 2-continued

| Positive Electrode | Compound | Amount added % by weight | Composition of electrolyte solution (volume ratio) | Initial discharge capacity (relative value) | Retention of discharge capacity after 200 cycles (%) |
|---|---|---|---|---|---|
| 18 $LiCo_{1/3}Ni_{1/3}Mn_{1/3}O_2$ | Diethyl acetylene-dicarboxylate | 1 | 1M $LiPF_6$ EC/PS/DMC/DEC = 30/2/34/34 | 1.00 | 82.4 |
| 19 $LiCo_{1/3}Ni_{1/3}Mn_{1/3}O_2$ | Diethyl acetylene-dicarboxylate | 2 | 1M $LiBF_4$ EC/VC/MEC = 30/2/68 | 1.00 | 81.5 |
| 20 $LiCo_{1/3}Ni_{1/3}Mn_{1/3}O_2$ | Methyl ethyl acetylene-dicarboxylate | 1 | 0.95 M $LiPF_6$ + 0.05 M $LiBF_4$ EC/VC/MEC = 30/2/68 | 1.00 | 83.2 |

It can be seen that, as shown in Tables 1 and 2, the lithium secondary batteries of the above Examples give higher retention (%) of discharge capacity after 200 cycle-repetition of the charging-and-discharging, by at least about 10%, than the lithium secondary batteries of Comparative Examples give, and exhibit better cycling characteristics for a long period of time.

INDUSTRIAL APPLICABILITY

A lithium secondary battery having excellent battery characteristics such as battery cycling property, electrical capacity and storage property can be obtained using the nonaqueous electrolyte solution of the present invention. In addition, the obtained lithium secondary battery can be suitably used as a cylindrical battery, a square-shaped battery, a coin-shaped battery, a laminated battery and the like.

The invention claimed is:

1. A nonaqueous electrolyte solution for lithium secondary batteries, in which an electrolyte salt is dissolved in a nonaqueous solvent, the nonaqueous electrolyte solution comprising 0.01 to 10% by weight of a carboxylate compound represented by the formula (I) shown below, and 0.01 to 10% by weight or 0.01 to 10% by volume of at least one selected from the group consisting of a vinylene carbonate and 1,3-propane sultone:

(I)

wherein $R^1$ represents a $C_1$ to $C_{12}$ alkyl group which may be branched, a $C_3$ to $C_8$ cycloalkyl group, a $C_2$ to $C_{12}$ alkenyl group which may be branched, a $C_2$ to $C_{12}$ alkynyl group which may be branched, or an unsubstituted or substituted phenyl group, $R^2$ represents a hydrogen atom or a $COOR^3$ group where $R^3$ represents a $C_1$ to $C_{12}$ alkyl group which may be branched, a $C_3$ to $C_8$ cycloalkyl group, a $C_2$ to $C_{12}$ alkenyl group which may be branched, a $C_2$ to $C_{12}$ alkynyl group which may be branched, or an unsubstituted or substituted phenyl group, and X represents a $C_2$ to $C_4$ alkynylene group.

2. A nonaqueous electrolyte solution as defined in claim 1, wherein the carboxylate compound represented by the above general formula (I) is at least one member selected from the group consisting of a dialkyl acetylenedicarboxylate having $C_1$ to $C_3$ alkyl groups, dialkyl 3-hexynedioate having $C_1$ to $C_3$ alkyl groups, and a dialkyl 2,4-hexadiynedioate having $C_1$ to $C_3$ alkyl groups.

3. The nonaqueous electrolyte solution of claim 2, wherein the carboxylate compound represented by formula (I) is at least one member selected from the group consisting of dimethyl acetylenedicarboxylate, diethyl acetylenedicarboxylate, diethyl 3-hexynedioate and dimethyl 2,4-hexadiynedioate.

4. A nonaqueous electrolyte solution as defined in claim 1, wherein the carboxylate compound represented by the general formula (I) is present in an amount of 0.05 to 5% by weight and at least one of the vinylene carbonate and the 1,3-propane sultone is present in an amount of 0.02 to 9% by volume.

5. A nonaqueous electrolyte solution as defined in claim 1, wherein the nonaqueous solvent contains at least one selected from the group consisting of cyclic ethylene carbonate and cyclic propylene carbonate.

6. A nonaqueous electrolyte solution as defined in claim 1, wherein the nonaqueous solvent contains at least one member selected from the group consisting of methyl ethyl carbonate, dimethyl carbonate and diethyl carbonate.

7. The nonaqueous electrolyte solution of claim 1, wherein the carboxylate compound represented by formula (I) is at least one member selected from the group consisting of dimethyl acetylenedicarboxylate, diethyl acetylenedicarboxylate, diethyl 3-hexynedioate and dimethyl 2,4-hexadiynedioate.

8. The nonaqueous electrolyte solution of claim 1, comprising both a vinylene carbonate and 1,3-propane sultone.

9. The nonaqueous electrolyte solution of claim 1, wherein $R^1$ is a $C_1$ to $C_{12}$ alkyl group, $R^2$ is a group $COOR^3$ where $R^3$ is a $C_1$ to $C_{12}$ alkyl group.

10. The nonaqueous electrolyte solution of claim 1, wherein the electrolyte salt is $LiPF_6$.

11. The nonaqueous electrolyte solution of claim 1, wherein the electrolyte salt comprises $LiBF_4$.

12. The nonaqueous electrolyte solution of claim 1, wherein $R^1$ represents a $C_1$ to $C_{12}$ alkyl group which may be branched, a $C_3$ to $C_8$ cycloalkyl group, a $C_2$ to $C_{12}$ alkynyl group which may be branched, or an unsubstituted or substituted phenyl group, $R^2$ represents a hydrogen atom or a $COOR^3$ group where $R^3$ represents a $C_1$ to $C_{12}$ alkyl group which may be branched, a $C_3$ to $C_8$ cycloalkyl group, a $C_2$ to $C_{12}$ alkynyl group which may be branched, or an unsubstituted or substituted phenyl group, and X represents a $C_2$ to $C_4$ alkynylene group.

13. A lithium secondary battery comprising a positive electrode, a negative electrode, and a nonaqueous electrolyte solution which includes an electrolyte salt dissolved in a nonaqueous solvent, the positive electrode including a lithium compound oxide-containing material, the negative electrode including a material which can occlude and release lithium, and the nonaqueous electrolyte solution comprising 0.01 to 10% by weight of a carboxylate compound represented by the formula (I) shown below, and 0.01 to 10% by weight or 0.01 to 10% by volume of at least one selected from the group consisting of vinylene carbonate and 1,3-propane sultone:

[Chemical formula 2]

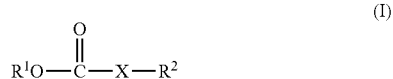

(I)

wherein $R^1$ represents a $C_1$ to $C_{12}$ alkyl group which may be branched, a $C_3$ to $C_8$ cycloalkyl group, a $C_2$ to $C_{12}$ alkenyl group which may be branched, a $C_2$ to $C_{12}$ alkynyl group which may be branched, or an unsubstituted or substituted phenyl group, $R^2$ represents a hydrogen atom or a $COOR^3$ group where $R^3$ represents a $C_1$ to $C_{12}$ alkyl group which may be branched, a $C_3$ to $C_8$ cycloalkyl group, a $C_2$ to $C_{12}$ alkenyl group which may be branched, a $C_2$ to $C_{12}$ alkynyl group which may be branched, or an unsubstituted or substituted phenyl group, and X represents a $C_2$ to $C_4$ alkynylene group.

14. The lithium secondary battery of claim 13, wherein the positive electrode comprises one or more lithium compound oxides containing at least one member selected from the group consisting of cobalt, manganese and nickel as a positive electrode active material.

15. The lithium secondary battery of claim 13, wherein the negative electrode comprises at least one member selected from the group consisting of a thermally decomposed carbon material, a coke, a graphite, a fired organic polymer body and a carbon fiber as a negative electrode active material.

16. The lithium secondary battery of claim 13, comprising both a vinylene carbonate and 1,3-propane sultone.

17. The lithium secondary battery of claim 13, wherein $R^1$ is a $C_1$ to $C_{12}$ alkyl group, $R^2$ is a group $COOR^3$, where $R^3$ is a $C_1$ to $C_{12}$ alkyl group.

18. The lithium secondary battery of claim 13, wherein the electrolyte salt is $LiPF_6$.

19. The lithium secondary battery of claim 13, wherein the electrolyte salt comprises $LiBF_4$.

20. The lithium secondary battery of claim 13, wherein $R^1$ represents a $C_1$ to $C_{12}$ alkyl group which may be branched, a $C_3$ to $C_8$ cycloalkyl group, a $C_2$ to $C_{12}$ alkynyl group which may be branched, or an unsubstituted or substituted phenyl group, $R^2$ represents a hydrogen atom or a $COOR^3$ group where $R^3$ represents a $C_1$ to $C_{12}$ alkyl group which may be branched, a $C_3$ to $C_8$ cycloalkyl group, a $C_2$ to $C_{12}$ alkynyl group which may be branched, or an unsubstituted or substituted phenyl group, and X represents a $C_2$ to $C_4$ alkynylene group.

* * * * *